United States Patent
Hadley (10) Patent No.: US 7,248,984 B2
(45) Date of Patent: Jul. 24, 2007

(54) SENSOR RESPONSE WITH COMPENSATION FOR SENSOR TYPE AND MEASURING EQUIPMENT TYPE

(75) Inventor: Maxwell R. Hadley, Lyndhurst (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 127 days.

(21) Appl. No.: 10/514,920

(22) PCT Filed: May 13, 2003

(86) PCT No.: PCT/GB03/02042

§ 371 (c)(1),
(2), (4) Date: Nov. 15, 2004

(87) PCT Pub. No.: WO03/098158

PCT Pub. Date: Nov. 27, 2003

(65) Prior Publication Data

US 2006/0074579 A1   Apr. 6, 2006

(30) Foreign Application Priority Data

May 17, 2002   (GB) ................... 0211387.6

(51) Int. Cl.
*G01C 25/00* (2006.01)
*G01D 18/00* (2006.01)

(52) U.S. Cl. ........................................... 702/104

(58) Field of Classification Search ................. 702/104
See application file for complete search history.

(56) References Cited

U.S. PATENT DOCUMENTS

| | | | | |
|---|---|---|---|---|
| 5,274,314 | A * | 12/1993 | Maqueira | 318/632 |
| 5,680,409 | A * | 10/1997 | Qin et al. | 714/799 |
| 6,351,117 | B1 * | 2/2002 | Ehling | 324/207.13 |

* cited by examiner

*Primary Examiner*—John Barlow
*Assistant Examiner*—Cindy D. Khuu
(74) *Attorney, Agent, or Firm*—Fred G. Pruner; Dona C. Edwards; Bryan P. Galloway (57) ABSTRACT

A method and apparatus for use when measuring pressure in hydrocarbon wells. A sensor, an interferometric optical pressure transducer, at the end of a fibre optic line is illuminated by broadband light pulses. Measuring equipment output drives a display indicating the pressure at the sensor. The transducer is modelled by subjecting it to known pressures. The measuring equipment is modelled by applying test signals. The models are combined and a display output C is assumed. A mathematical model is used to calculate an estimation B of the actual output A from the sensor. B is compared with A and the value of C changed until the closest match is found between A and B. This value of C is taken as the output representing the pressure at the sensor. Different models and compensation factors allow for interchange of sensors and sensor types and measuring equipment and measuring equipment types.

22 Claims, 6 Drawing Sheets

SENSOR RESPONSE WITH COMPENSATION FOR SENSOR TYPE AND MEASURING EQUIPMENT TYPE

BACKGROUND OF THE INVENTION

1. Field of the Invention

The present invention relates to measurement systems, designed to read the value of a parameter, such as pressure, flow control, strain, chemical properties, or temperature, where the sensor is connected to a measurement box, optionally with a length of cable or other components between the two, for the measurement box to give a value for the parameter being measured. The present invention relates to such systems where different sensors can be attached to different measurement boxes. The example given for the embodiment of the present invention particularly relates to, but is not limited to, systems for reading parameters where the measurement box can be separated from the transducer by a large length, perhaps some kilometres in length, of fibre optic cable, and where the transducer is an optical transducer.

2. Description of Related Art

High precision optical measurement instruments, for example for measuring pressure at the bottom of a well bore in a hydrocarbon well, usually comprise a transducer situated within the well bore, a fibre optic cable leading to the transducer, at the distal end of which the transducer is situated, and measurement equipment, out of the well bore, for interrogating the transducer through the fibre optic cable and providing output indicative of the pressure to which the transducer is instantly subject.

The individual transducers are generally individually calibrated, with their individual measurement instruments, by subjecting the individual transducer to controlled values of the parameter to be measured (e.g. pressure) and noting the value of the output of the measuring equipment. In general, all transducers, even those of the same type, give different outputs from each other for the same parametric stimulus, and all measuring equipment, even those of the same type, give different readings from each other for the same output from a transducer. This is due to differences in the manufacturing process, dimensions, material properties, and alignment, among others, from sensor to sensor or from box to box. The present invention seeks to provide a method and means for allowing different measuring equipment to be connected to different sensors without loss of accuracy and without having to re-calibrate the entire system.

BRIEF SUMMARY OF THE INVENTION

According to a first aspect, the present invention consists in a method for estimating the response of a sensor operatively connected to measuring equipment, the sensor being of a sensor type and the measuring equipment being of a measuring equipment type, when subject to a parametric stimulus, said method including the steps of: modelling the operation and output of the sensor type, determining a compensating factor uniquely associated with the specific sensor used, modelling the operation and output of the measuring equipment type, determining a compensating factor uniquely associated with the specific measuring equipment used, and estimating the response of the specific sensor and the specific measuring equipment to the parametric stimulus by combining the model of the sensor including the sensor compensating factor and the model of the measuring equipment including the measuring equipment compensating factor.

The invention further provides that the sensor and measuring equipment can be an optical or non-optical instruments.

The invention further provides that the sensor can sense pressure, flow rate, strain, temperature, and chemical property, among others.

The invention further provides that the sensor may be deployed in a hydrocarbon well.

The invention further provides that the sensor compensating factor may be determined by attaching the specific sensor to test equipment, applying known stimuli to the specific sensor, and noting the sensor response to each stimulus.

The invention further provides that the measuring equipment compensating factor may be determined by attaching the specific measuring equipment to test equipment, applying known stimuli to the specific measuring equipment, and noting the measuring equipment response to each stimulus.

The invention further comprises that the estimating step can include, for a given output measured by the measuring equipment caused by a parameter acting on the sensor, obtaining the actual measuring equipment output, assuming the sensor parameter value, calculating the expected measuring equipment output given the assumed sensor parameter value, comparing the actual measuring equipment output with the expected measuring equipment output, assuming another sensor parameter value if the actual and expected measuring equipment output do not match, and determining that the actual sensor parameter value is equal to the sensor parameter value which provides the closest match between the actual and expected measuring equipment output.

The invention further comprises that the sensor may be interchanged with another sensor of the same type, without losing accuracy or having to re-calibrate the entire system, by inputting the compensating factor of the new sensor into the mathematical model of the sensor type.

The invention further comprises that the measuring equipment may be interchanged with another measuring equipment of the same type, without losing accuracy or having to re-calibrate the entire system, by inputting the compensating factor of the new measuring equipment into the mathematical model of the measuring equipment type.

The invention further comprises that the sensor may be interchanged with a sensor of another type, without losing accuracy, by modeling the operation and output of the new sensor type and determining the compensating factor uniquely associated with the specific sensor used.

The invention further comprises that the measuring equipment may be interchanged with a measuring equipment of another type, without losing accuracy, by modelling the operation and output of the new measuring equipment type and determining the compensating factor uniquely associated with the specific measuring equipment used.

According to a second aspect, the present invention consists in a system for measuring a parameter, comprising: a sensor belonging to a type of sensor, a measuring equipment belonging to a type of measuring equipment, means for accepting a model of the sensor type and a model of the measuring equipment type, means for accepting a compensating factor for the specific sensor and a compensating factor for the specific measuring equipment, and means for combining the model of the sensor including the sensor compensating factor and the model of the measuring equipment including the measuring equipment compensating factor for estimating the parameter measured by the sensor.

The invention further provides that the sensor and measuring equipment can be optical or non-optical instruments.

The invention further provides that the sensor can sense pressure, flow rate, strain, temperature, and chemical property, among others.

The invention further provides that the sensor may be deployed in a hydrocarbon well.

The invention further provides that the sensor may be exchanged with another sensor of the same or different type without losing accuracy.

The invention further provides that the measuring equipment may be exchanged with another measuring equipment of the same or different type without losing accuracy.

BRIEF DESCRIPTION OF THE DRAWINGS

The invention is further explained, by way of example, by the following description, to be read in conjunction with the appended drawings, in which.

And

DETAILED DESCRIPTION OF THE INVENTION

As previously disclosed, the present invention relates to a system including a sensor and connected measuring equipment. In general, the sensor is used to sense a parameter of interest, such as pressure, temperature, flow rate, strain, or chemical properties. The sensor measures the parameter, and the connected measuring equipment interprets and perhaps analyzes the sensor measurement and provides a reading. It is noted that the present invention may function with any measuring equipment and sensor, optical or non-optical. The present invention allows sensors of the same type and measuring equipment of the same type to be interchanged in the system without the need to re-calibrate the system after each sensor or measuring equipment change and without the loss of accuracy. The invention is particularly useful if the system is used in remote locations, such as hydrocarbon wells.

Figure 1:
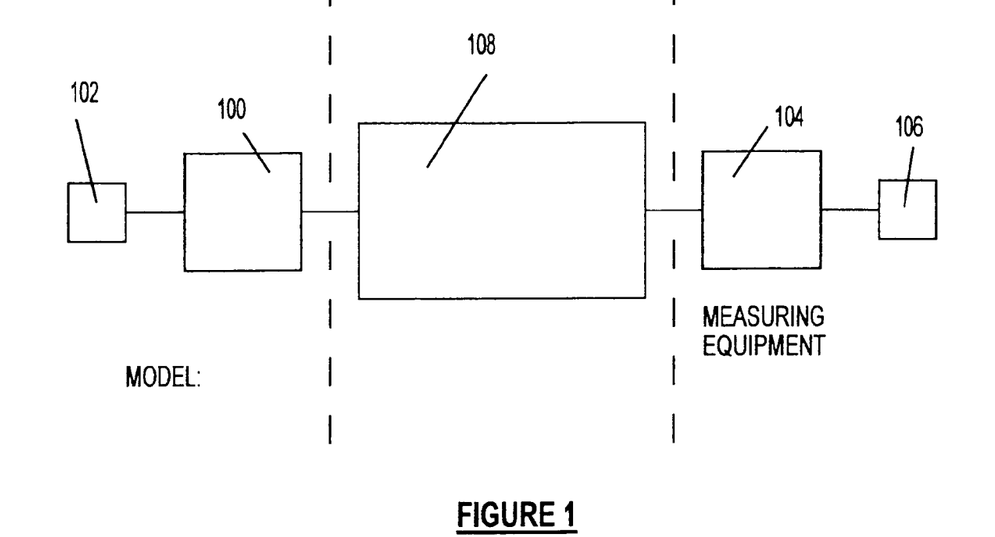
FIG. 1 is a schematic diagram exemplifying the overall technique according to the present invention.

Attention is first drawn to FIG. 1, which schematically illustrates the overall technique of the present invention. At step 100, an operator generates a mathematical model of the sensor type. The mathematical model includes variables, the values of which variables are different for each specific sensor of the relevant sensor type due to differences, from sensor to sensor of the same type, in the manufacturing process, dimensions, material properties, alignment, among others. At step 102, an operator tests a specific sensor of the relevant type to determine the values of the variables of the mathematical model. Once determined, the variables of the specific model are inputted into the sensor model. At step 104, an operator generates a mathematical model of a type of measuring equipment. The mathematical model includes variables, the values of which variables are different for each specific measuring equipment of the relevant measuring equipment type due to differences, from equipment to equipment of the same type, in the manufacturing process, dimensions, material properties, alignment, among others. At step 106, an operator tests a specific measuring equipment of the relevant type to determine the values of the variables of the mathematical model. Once determined, the variables of the specific model are inputted into the measuring equipment model. At step 108, the complete sensor model is then combined with the complete measuring equipment model to allow the function of the system, as will be described.

It is noted that if an operator wishes to change the type of sensor or type of measuring equipment in the system, then a new mathematical model would have to be generated.

Figure 2:
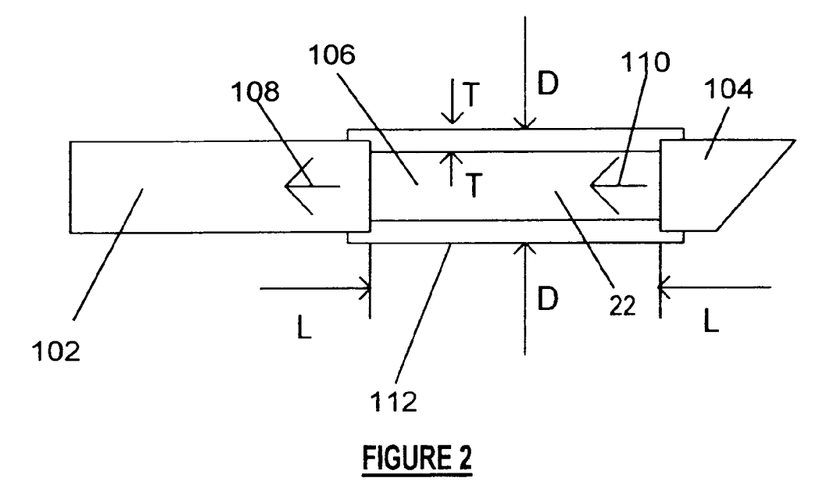
FIG. 2 illustrates the different dimensions and parts of a particular style of sensor.

FIG. 2 shows the various parts of an exemplary sensor 22, an optical inteferometric transducer in this case. An input optic fibre 102 forms the input to the interferometer chamber and an end fibre optic plug 104 defines the limit to the sensor 22. A difference path 106 is formed between the input optic fibre 102 and the end fibre optic plug 104. The incoming light is first reflected, as indicated by first arrow 108, from the junction between the end of the input optic fibre 102 and the beginning of the difference path 106. Light which has passed into the difference path 106 is reflected from the inward face of the end fibre optic plug 104, as indicated by second arrow 110. Interference occurs between the two reflected light waves due to the path difference, i.e twice the length between the end of the input optic fibre 102 and the inward face of the end fibre optic plug 104.

A cylindrical shell 112 supports the input optic fibre 102 and the end fibre optic plug 104. As the pressure varies, so the difference path 106 varies in length as the dimensions of the sensor vary.

The particular sensor 22 has various properties. In this simple example of a simple hollow cylinder, there is, first, the material of the cylindrical shell 112. There is the overall diameter D of the cylindrical shell 112. There is the length L of the difference path 106. There is the thickness T of the cylindrical shell 112. More elaborate transducers or sensors could have more elaborate geometries, different substances filling the difference path 106, and so on, and a corresponding increase in the number of parameters.

Figure 3:
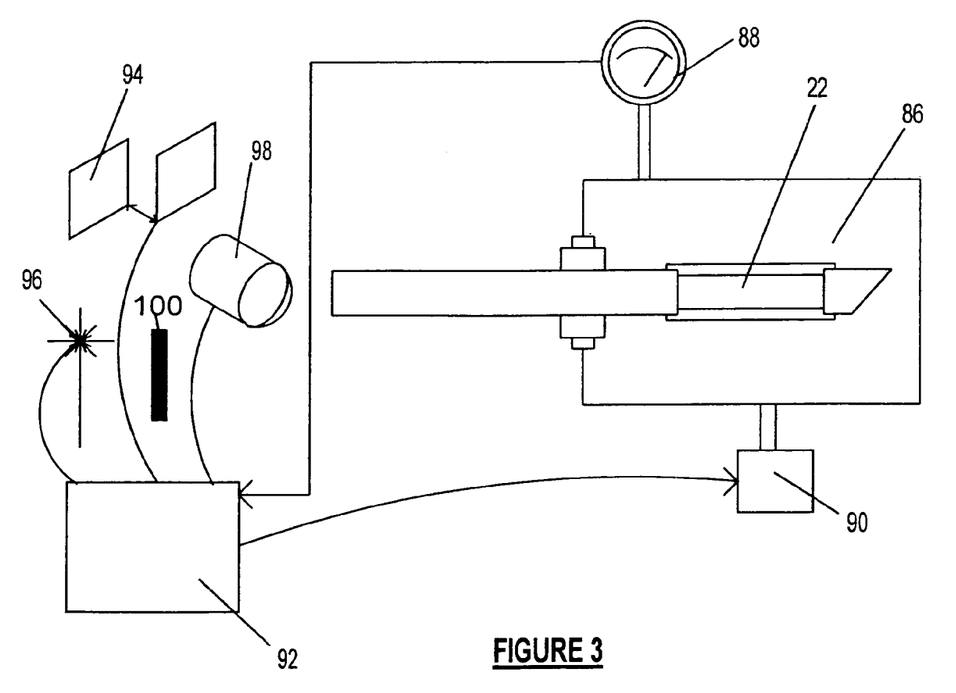
FIG. 3 is a schematic diagram of one method, according to the present invention, whereby a style or family of sensors can be tested so that the compensating parameters of a particular sensor can be determined in order to include them in the mathematical model of the sensor type.

At this stage, attention is also drawn to FIG. 3, showing a schematic test setup for a sensor 22.

In FIG. 1, at step 100, the relevant sensor type, in this case sensor type 22, is analyzed to determine the parameters of the sensor that affect the output or reading of the sensor. Relationships between these parameters which in the aggregate provide the output or reading of the sensor are also derived. Incorporating all of these together, a mathematical model is derived which can be used to calculate the operation of the sensor. The accuracy of the model may be tested by physically testing one or a number of the relevant sensors. When deriving the model, the compensating parameters of the sensor type, which as previously disclosed change from sensor to sensor in each type, are left as variables.

At step 102, once a specific sensor of the relevant type is to be assigned or attached to the system, the sensor must be tested to determine the compensating parameters of such specific sensor. FIG. 3 shows one way in which a sensor, such as the sensor 22 which measures pressure, can be tested. The transducer 22 is placed within a pressure chamber 86 (shown in FIG. 3) where one or more measuring instruments 88 can measure the applied pressure the transducer experiences and a controllable pump 90 can be used to adjust the pressure within the pressure chamber 86. A modelling processor 92 is provided with the mathematical model describing the type of sensor being tested. The processor 92 then causes the pump 90 to apply a range of different pressures to the sensor. At each such pressure step, the processor 92 measures the optical response of the sensor using optical instruments, such as inteferometers 94, modulated light sources 96, photo detectors 98, and filters 100. On completion of a series of such measurements, the processor 92 determines the set of compensating factors which, when substituted into the mathematical model, best describes the specific sensor's measured response.

Figure 4:
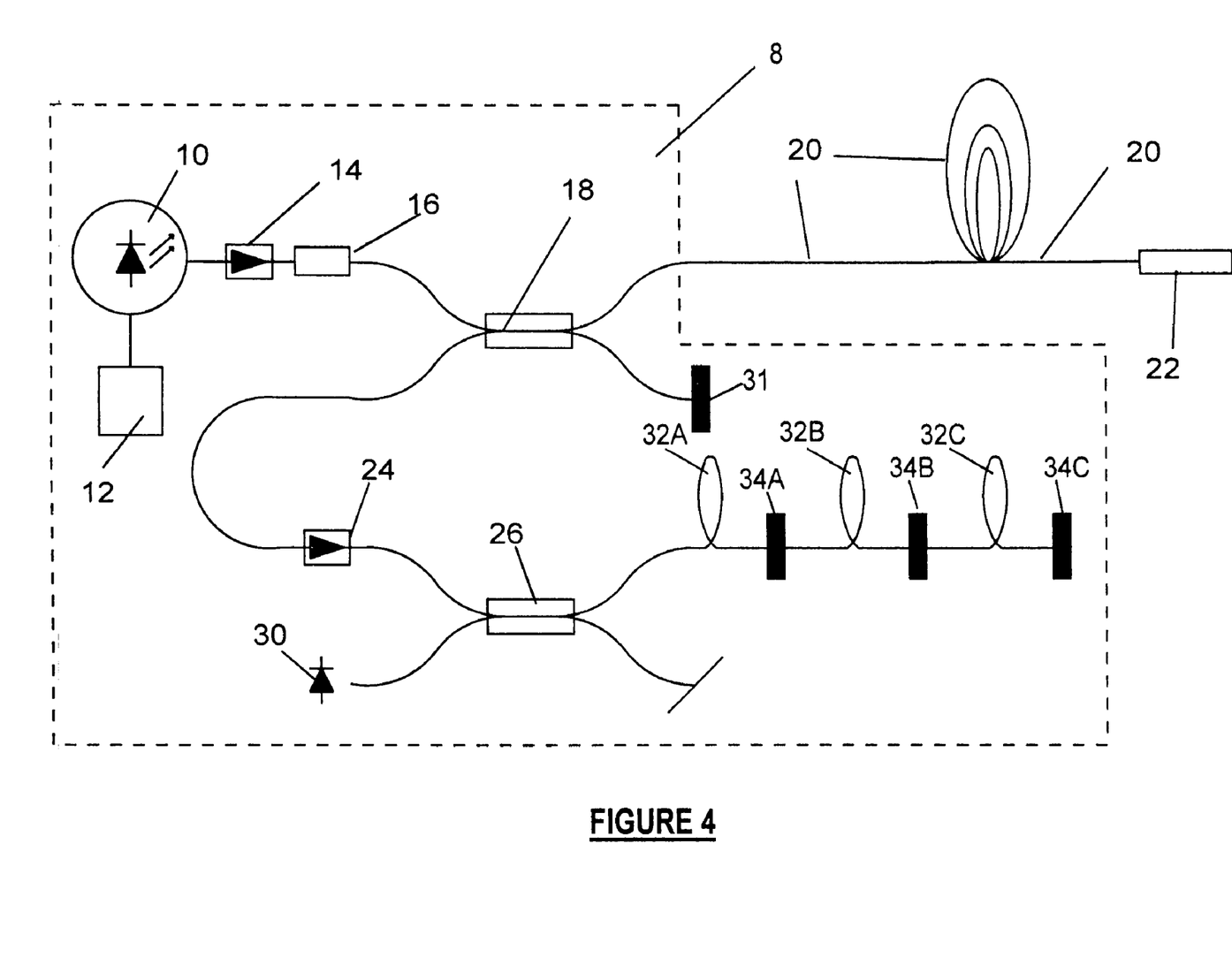
FIG. 4 is a schematic diagram showing the particulars of an exemplary measuring equipment.

FIG. 4 shows the various parts of an exemplary measuring equipment 8, in this case an optical measuring equipment that employs a pulsed broad band light source.

Measuring equipment 8 comprises a pulsed broadband light source 10 which is repetitively driven by a light source modulator 12 to emit narrow light pulses of the order of a few microseconds or less long via a first optical isolator 14 and a polarisation scrambler 16 to deliver pulses of randomly polarised light through a first coupler 18 to a fibre optic line 20 at the distal end of which a sensor 22 is situated. A broadband reflector 31 is included at the other junction of coupler 18. The sensor 22 may be at the distal end of many kilometres of fibre optic line 20 and can be situated in a hostile environment such as a hydrocarbon well.

The broadband reflector 31 and the sensor 22 reflect the incident broadband pulse in two sets of reflected pulses. Each set is reflected back towards the first coupler 18 which sends the pulses through a second optical isolator 24 to a second coupler 26. A chain of narrowband filters 34A 34B 34C is coupled to the coupler 26 with a delay line 32A 32B 32C located before each filter 34A 34B 34C.

The single photo detector 30 is a high speed device capable of resolving individual reflected pulses.

Figure 5:
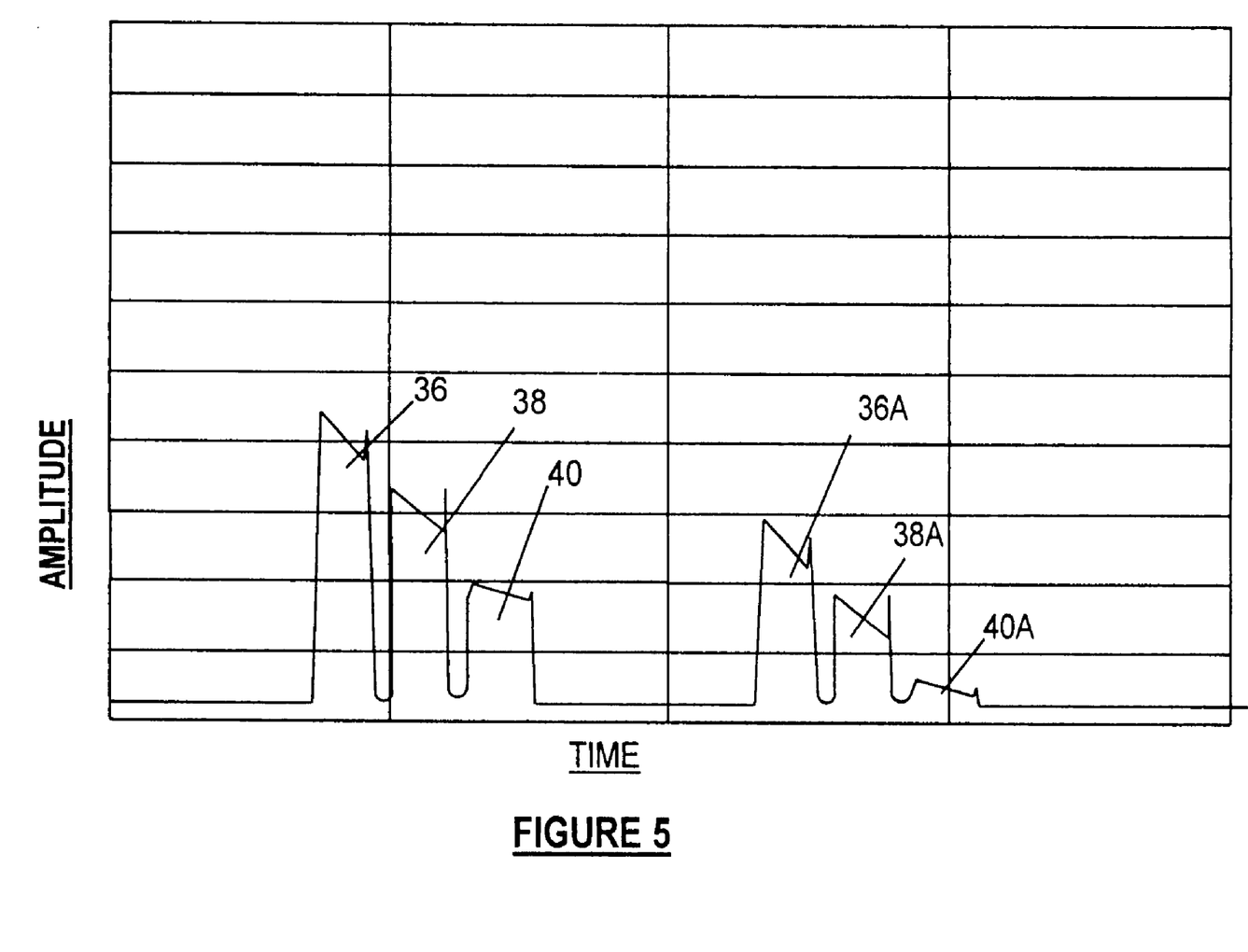
FIG. 5 is a graph of the intensity of pulses of light which can be found in the apparatus of FIG. 4.

Attention is also, at this stage, drawn to FIG. 5, showing exemplary pulses as observed in the system of FIG. 1, in response to a single pulse of light from the light source 10.

FIG. 5 is the time graph of signals intercepted by the single photo detector 30. The first set of observed pulses 36 38 40 are the result of a light pulse from the light source 10 occurring at the time indicated by arrow 42 and being reflected by the broadband reflector 31 and then by each of the narrowband filters 34A 34B 36B. The second set of observed pulses 36A 38A 40A are the result of the light pulse being reflected by the sensor 22 and then by each of the narrowband filters 34A 34B 34C. Generally, the pulses detected by the photo-detector 30 can then be used to determine the reading of the sensor 22.

The particular measuring equipment 8 has various properties. In this example, the filter centre wavelengths and band widths 31 34A 34B 34C, the loss spectra of fibres 20 32A 32B 32C, the polarization scrambler 16, the isolators 14 24, and the couplers 18 26, and the emission spectra of light source 10 are all examples of parameters that determine the output of the measuring equipment 8. More elaborate measuring equipment could have a corresponding increase in the number of parameters.

At step 104, in FIG. 1, the relevant measuring equipment type, in this case measuring equipment type 8, is analyzed to determine the parameters of the measuring equipment that affect the output or reading of the equipment. Relationships between these parameters which in the aggregate provide the output or reading of the equipment are also derived. Incorporating all of these together, a mathematical model is derived which can be used to calculate the operation of the measuring equipment. The accuracy of the model may be tested by physically testing one or a number examples ofof the relevant measuring equipment type. When deriving the model, the compensating parameters of the measuring equipment type, which as previously disclosed change from equipment to equipment in each type, are left as variables.

Figure 6:
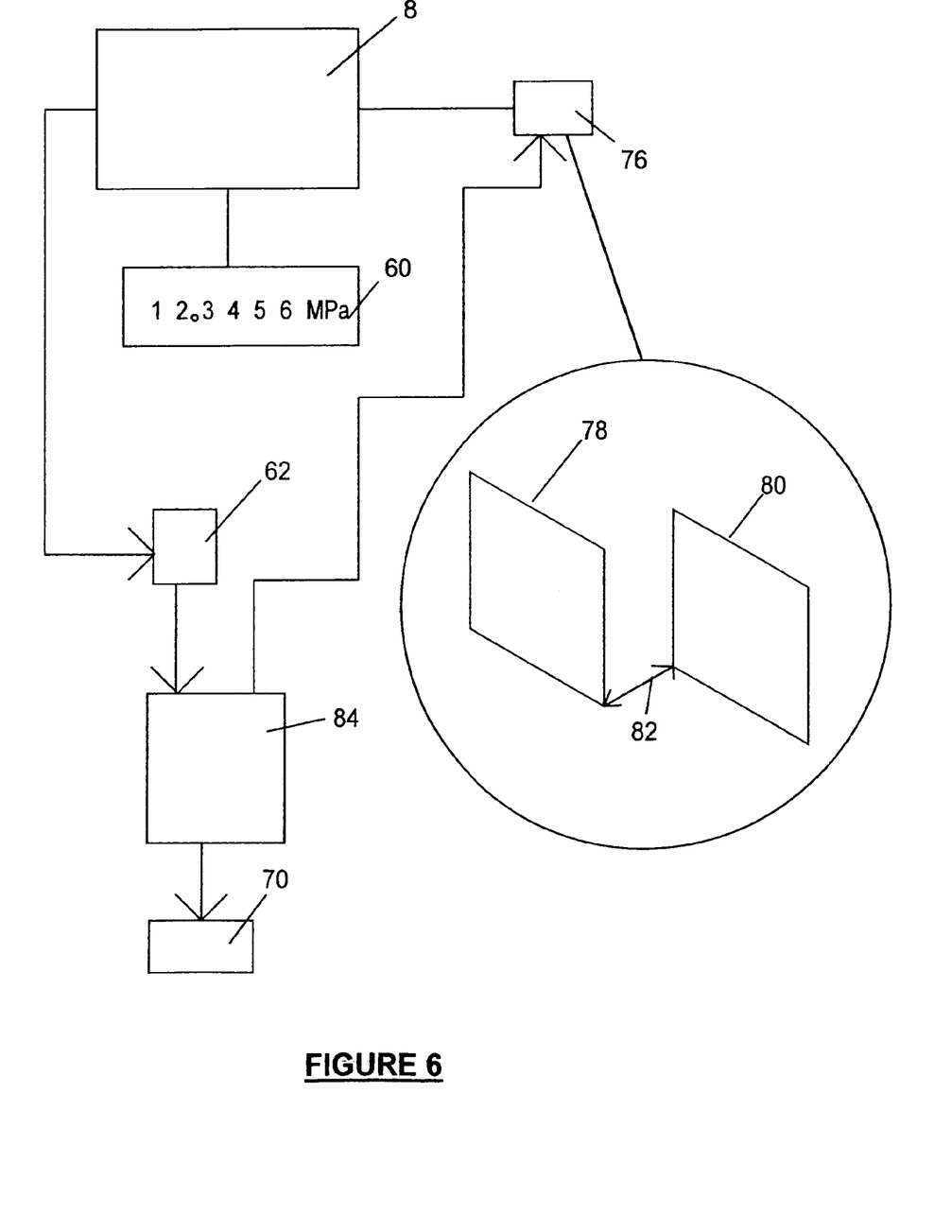
FIG. 6 is a schematic diagram of one way in which the measuring equipment of FIG. 4 can be tested so that the compensating parameters of a particular measuring equipment can be determined in order to include them in the mathematical model of the measuring equipment type.

At step 106, once a specific measuring equipment of the relevant type is to be assigned or attached to the system, the measuring equipment must be tested to determine the compensating parameters of such specific measuring equipment. FIG. 6 shows one way in which a measuring equipment, such as the optical measuring equipment 8, can be tested. Measurement equipment 8 is coupled to a settable or measurable calibrating interferometer 76 comprising (shown in magnified detail) a front reflector 78 and a rear reflector 80 separated by a known, and/or accurately measurable and/or accurately settable spacing 82. A calibrating processor 84 receives the output indication of the measurement equipment and provides the measurement equipment 8 compensating factor. The equipment calibrating processor 84 can be coupled to control the calibrating interferometer 76 so that the spacing 82 can be set to a range of known values and the output of the measuring equipment 8 and compensating factor noted.

Alternatively, the calibrating interferometer 76 can be a range of fixed interferometers of known, different spacings 82, the identity and/or spacing of the particular interferometer providing input to the measuring equipment being entered to the equipment calibrating processor 84 by keyboard, bar code reader or any other means and the output of the measuring equipment 8 being used to compile the measuring equipment compensating factor.

Alternatively, the measuring equipment 8 can be so arranged that the compensating parameters are directly measurable using generally available laboratory test and calibration instruments. In such case, the compensating parameters may be arrived at without use of calibration processor 84 by direct measurement, as for example at a factory or periodic calibration of measuring equipment 8.

As another measure, the equipment calibrating processor 84 can be omitted, a single, robust calibrating interferometer 76 provided, and the output can be transmitted to a display 60

Figure 7:
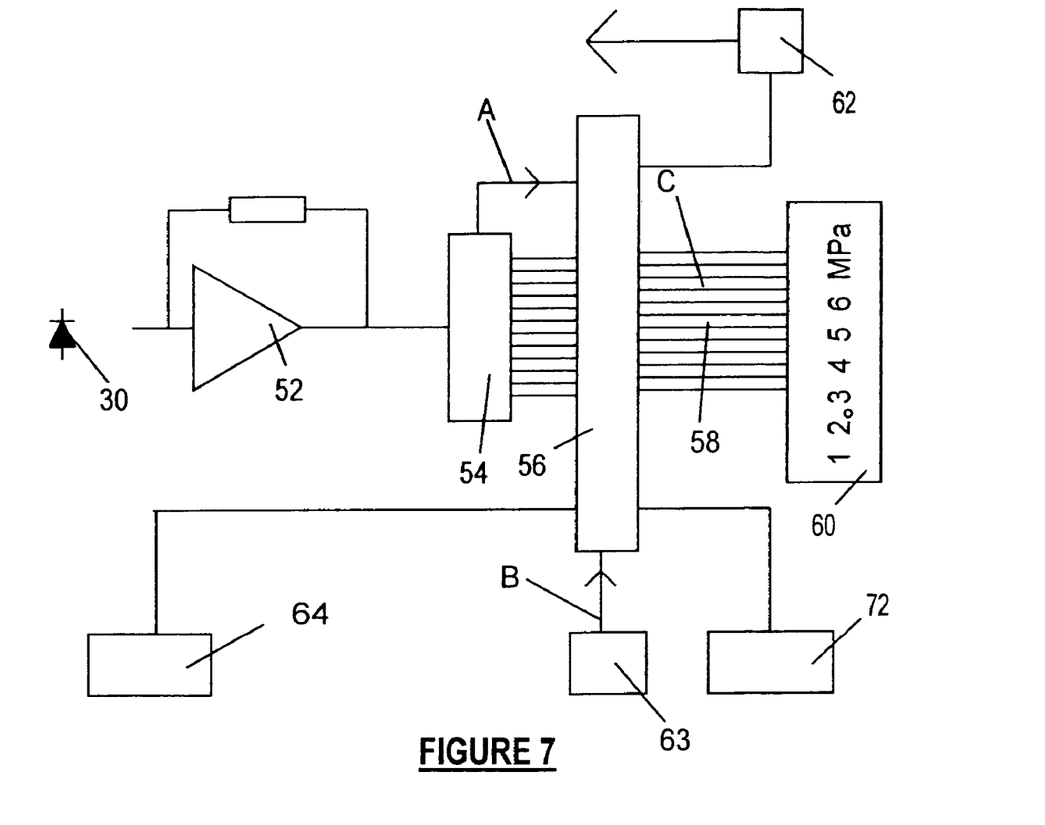
FIG. 7 is a schematic block diagram of one way in which the present invention may be implemented.

FIG. 7 shows one way in which the present invention may be implemented. Output from the measuring equipment, such as the photo-detector 30, can be amplified by a wide band amplifier 52 and provided, via a high speed analog to digital converter 54 to a microprocessor 56. Microprocessor 56 derives the value of the parameter measured by the sensor (for instance, downhole pressure in a hydrocarbon well) and provides output 58 which can drive a display device 60 to display the value measured. Equally, the microprocessor can drive an external communications device 62 which can drive external and/or remote equipment to display, log, or further process the data.

Attached to the microprocessor 56 are a sensor compensating input 64 and a measuring equipment compensating input 72. The sensor compensating input 64 can include the sensor mathematical model of the relevant sensor type together with the compensating factor of the specific sensor being used in the system. The measuring equipment compensating input 72 can include the measuring equipment model of the relevant measuring equipment type together with the compensating factor of the specific measuring equipment being used in the system.

In one embodiment, each of the compensating inputs 64 72 comprises a micro switch array, including a plurality of banked micro switches. In another embodiment, each of the compensating inputs 64 72 comprises a data socket designed to accept the insertion of a data module 70 which bears the compensating factor and mathematical model for the relevant instrument. In yet further embodiments, the compensating inputs 64 72 can comprise smart cards, magnetic and optical tapes and discs, and swipe reader cards, to name but a few. The data can be used not only to compensate as previously indicated, but also to correct for any non linearity. Finally, the compensating factors can be provided in printed form, to be applied later when the actual output reading of the measuring equipment is considered.

The compensating factors can also be combined at a single input 63 which provides an input B which is the expected output A of the measuring equipment when the output indication 58 has the value C.

The microprocessor 56 accepts the data from the compensating inputs 63 64 72 (shown combined as input B from box 63) to provide an expected output B from the measuring equipment, as well as the output A actually received from the measuring equipment to provide an output indication 58 which represents a true indication of the parameter measured by the sensor.

Figure 8:
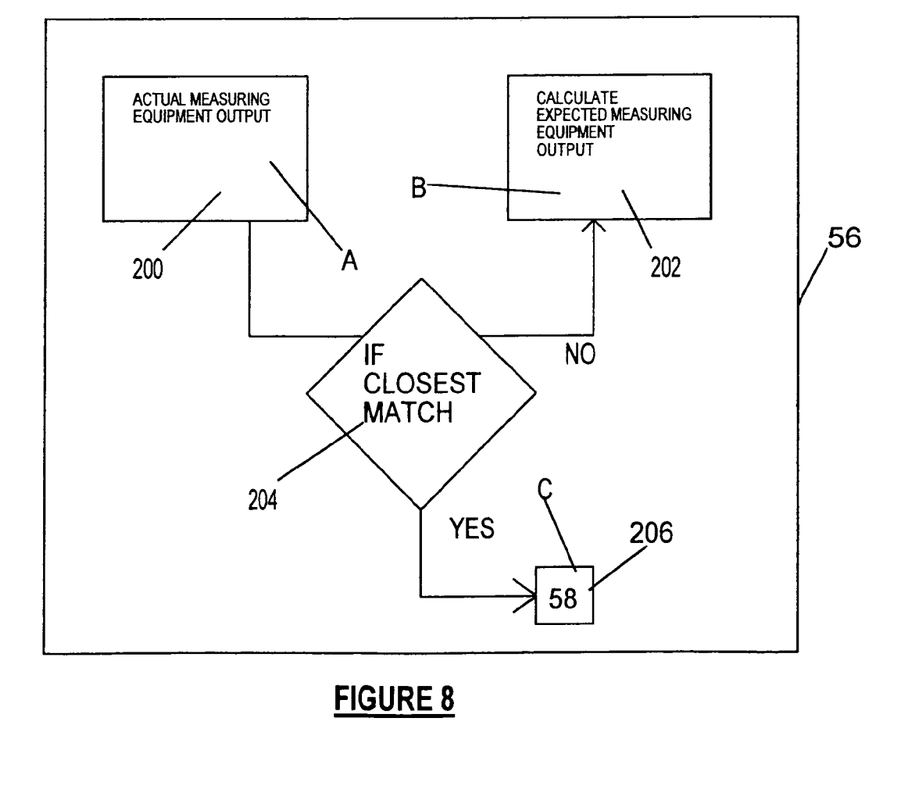
FIG. 8 is a block diagram of the calculation made to estimate the parameter sensed by the sensor using the present technique.

FIG. 8 illustrates the calculation technique. The microprocessor 56 receives the actual output A from the measuring equipment, such as from photo-detector 30, at step 200. At step 202, the microprocessor 56 then assumes an output indication 58 and uses such assumption and the mathematical models of the sensor and measuring equipment (received from the compensating inputs 64 72) to calculate the expected measuring equipment output B. The microprocessor 56 next, at step 204, compares the value B of step 202 and the value A of step 200. If the expected measuring equipment output B is not close to the actual measured measuring equipment output A, the microprocessor 56 updates the assumed stimulus in the appropriate direction and uses such updated assumption and the mathematical models of the sensor and measuring equipment to recalculate the expected measuring equipment output (again at step 202). This iterative process continues until microprocessor 56 identifies the closest match between the actual and expected measuring equipment outputs. Once this closest match C is found at step 206, the microprocessor 56 chooses the updated stimulus that provided the closest match as the output indication 58 or result. The output indication 58 represents the parameter measured by the sensor.

By way of further explanation, with reference again to FIG. 7, the output indication 58 can be taken as the closest match found C at step 206. The input A corresponds to the actual output A from the measuring equipment, as received at step 200. The input B is the value of A which the mathematical process (model) expects to find for that closest match output (C). The process involves:

Measure A
Assume a value for C
Calculate what B should be.
Compare B with A
Keep moving C until A and B agree.
Output is the value of C when A most closely agrees with B.

The fact that the sensor and the measuring equipment are modelled separately and are then combined enables an operator of the system to exchange different sensors of the same type and different measuring equipment of the same type. If an operator wishes to replace a sensor with another sensor of the same type, then all that needs to be done is to determine the compensating parameters of the specific new sensor and include them in the sensor compensating input 64, as previously disclosed. Likewise, if an operator wishes to replace a measuring equipment with another measuring equipment of the same type, then all that needs to be done is to determine the compensating parameters of the specific new measuring equipment and include them in the measuring equipment compensating input 72, as previously disclosed.

An operator may also remove the sensor and/or measuring equipment and replace them with a sensor or measuring equipment of a completely different type. In order to do so however, a new mathematical model for the relevant sensor and/or measuring equipment type will need to be derived and inputted in the relevant compensating inputs 64 72. The compensating factor for the specific sensor or measuring equipment will also have to be inputted in the same, as previously disclosed.

In any of the removal, changing, or replacement cases discussed immediately above, the output indication 58 is automatically correct because of the application of the present invention. Thus, an exchange does not lead to a loss of accuracy or the need to re-calibrate the system.

It will be readily understood that the principle of modelling separately the sensor and the measuring equipment, in order to provide compensating factors which may be readily interchanged when different sensors are used with different measuring equipment, can be extended to include the modelling of the components interconnecting the sensor and the measuring equipment. This provides that the effect of such components can be predicted based on readily-measurable parameters.

By way of example, such components may include optical fibres, optical connectors and splices, optical switches and attenuators, and special purpose optical components such as pressure seals or rotary joints. Furthermore, additional optical components may be employed to render the parameters of such interconnecting components continuously measurable during the operation of the measurement system, instead of or in addition to periodic calibration measurements. Such components will comprise in general broadband reflectors or mirrors, tap couplers and the like, and the continuous measurement of such parameters may be carried out by the primary measuring equipment or by other means.

The invention claimed is:

1. A method for estimating the response of a sensor operatively connected to measuring equipment, the sensor being of a sensor type and the measuring equipment being of a measuring equipment type, when subject to a parametric stimulus, said method including the steps of: modelling the operation and output of the sensor type, determining a compensating factor uniquely associated with the specific sensor used, modelling the operation and output of the measuring equipment type, determining a compensating factor uniquely associated with the specific measuring equipment used, and estimating the response of the specific sensor and the specific measuring equipment to the parametric stimulus by combining the model of the sensor including the sensor compensating factor and the model of the measuring equipment including the measuring equipment compensating factor, the estimating including the steps of: for a given output measured by said specific measuring equipment caused by a parameter acting on said specific sensor, obtaining the actual output of said specific measuring equipment; assuming the sensor parameter value, calculating the expected output of said specific measuring equipment given the assumed sensor parameter value; comparing the actual output of said specific measuring equipment with the expected output of said specific measuring equipment; assuming another value for said sensor parameter if the actual output and the expected output of said specific measuring equipment do not match; determining that the actual sensor parameter value is equal to the sensor parameter value which provides the closest match between the actual and expected outputs of said specific measuring equipment; and outputting said sensor parameter value which provides said closest match.

2. A method, according to claim 1, wherein said step of determining a compensating factor uniquely associated with the specific sensor used includes the steps of: attaching said specific sensor used to test equipment; applying known stimuli to the specific sensor used; and noting the response of said specific sensor used to each stimulus.

3. A method, according to claim 1 or claim 2, wherein said step of determining a compensating factor uniquely associated with the specific measuring equipment used includes the steps of: attaching said specific measuring equipment used to test equipment; employing said test equipment to apply known stimuli to said specific measuring equipment used; and noting the response of said specific measuring equipment used to each stimulus.

4. A method, according to claim 1, comprising the step of interchanging the sensor with another sensor of the same type, without losing accuracy or need for re-calibration, by inputting the compensating factor of said another sensor into the model of the sensor type.

5. A method, according to claim 1, comprising the step of interchanging said measuring equipment with another measuring equipment of the same type, without losing accuracy or need for re-calibration, by inputting the compensating factor of said another measuring equipment into the model of the measuring equipment type.

6. A method, according to claim 1, comprising the step of interchanging said sensor with a sensor of another type, without losing accuracy, by modelling the operation and output of said sensor of another type and determining the compensating factor uniquely associated with the specific sensor of another type used.

7. A method, according to claim 1, including the step of interchanging said measuring equipment with a measuring equipment of another type, without losing accuracy, by modelling the operation and output of said measuring equipment of another type and determining the compensating factor uniquely associated with the specific measuring equipment of another type used.

8. A method, according to claim 1, for use where sensor and measuring equipment are optical instruments.

9. A method, according to claim 1, for use where sensor and measuring equipment are non-optical instruments.

10. A method, according to claim 1, wherein said sensor is operative to sense at least one of: pressure, flow rate, strain, temperature, and chemical property.

11. A method, according to claim 1, for use where said sensor is deployed in a hydrocarbon well.

12. An apparatus for estimating the response of a sensor operatively connected to measuring equipment, the sensor being of a sensor type and the measuring equipment being of a measuring equipment type, when subject to a parametric stimulus, said apparatus comprising: sensor modelling means operative to model the operation and output of the sensor type and to determine a compensating factor uniquely associated with the specific sensor used, and operative, upon attachment of said specific sensor used to test equipment and application of known stimuli to the specific sensor used, to note the response of said specific sensor used to each stimulus; measuring equipment modelling means, operative to model the operation and output of the measuring equipment type, and to determine a compensating factor uniquely associated with the specific measuring equipment used; and response estimation means, operative to estimate the response of the specific sensor and the specific measuring equipment to the parametric stimulus by combining the model of the sensor including the sensor compensating factor and the model of the measuring equipment including the measuring equipment compensating factor.

13. An apparatus, according to claim 12, wherein said measuring equipment modelling means is operative, upon attachment of said specific measuring equipment used to test equipment, and application of known stimuli to said specific measuring equipment used, to note the response of said specific measuring equipment used to each stimulus.

14. An apparatus, according to claim 12, wherein said response estimation means is: operative, for a given output measured by said specific measuring equipment caused by a parameter acting on said specific sensor, to obtain the actual output of said specific measuring equipment; assuming the sensor parameter value, operative to calculate the expected output of said specific measuring equipment given the assumed sensor parameter value; operative to compare the actual output of said specific measuring equipment with the expected output of said specific measuring equipment; operative to assume another value for said sensor parameter if the actual output and the expected output of said specific measuring equipment do not match; and operative to determine that the actual sensor parameter value is equal to the sensor parameter value which provides the closest match between the actual and expected outputs of said specific measuring equipment.

15. An apparatus, according to claim 12, wherein said sensor is interchangeable with another sensor of the same type, without losing accuracy or need for re-calibration, by inputting the compensating factor of said another sensor into the model of the sensor type.

16. An apparatus, according to claim 12, wherein said measuring equipment is interchangeable with another measuring equipment of the same type, without losing accuracy or need for re-calibration, by inputting the compensating factor of said another measuring equipment into the model of the measuring equipment type.

17. An apparatus, according to claim 12, wherein said sensor is intercbsngeable with a sensor of another type, without losing accuracy, by modelling the operation and output of said sensor of another type and determining the compensating factor uniquely associated with the specific sensor of another type used.

18. An apparatus, according to claim 12, wherein said measuring equipment is interchangeable with a measuring equipment of another type, without losing accuracy, by modelling the operation and output of said measuring equipment of another type and determining the compensating factor uniquely associated with the specific measuring equipment of another type used.

19. An apparatus, according to claim 12, wherein said sensor and said measuring equipment are optical instruments.

20. An apparatus, according to claim 12, wherein said sensor and said measuring equipment are non-optical instruments.

21. An apparatus, according to claim 12, wherein said sensor is operative to sense at least one of: pressure, flow rate, strain, temperature, and chemical property.

22. An apparatus, according to claim 12, for use where said sensor is deployed in a hydrocarbon well.

* * * * *